Sept. 8, 1970  G. KRAMER  3,527,946
SEMICONDUCTOR DOSIMETER HAVING LOW
TEMPERATURE DIFFUSED JUNCTION
Filed June 13, 1966  2 Sheets-Sheet 1
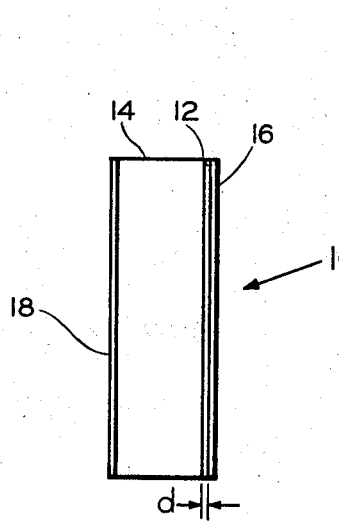
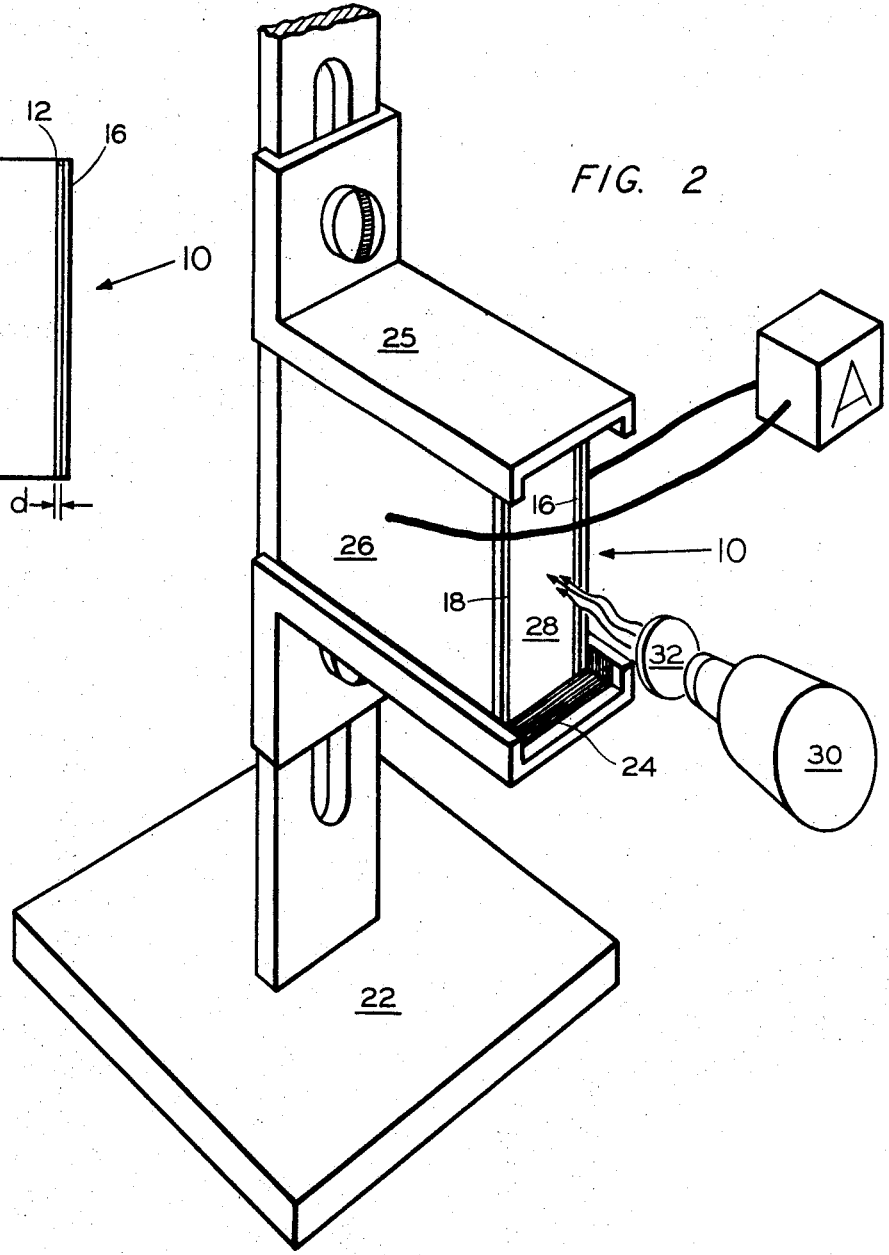
INVENTOR.
GORDON KRAMER
BY Gray, Mase & Dunson
ATTORNEYS INVENTOR.
GORDON KRAMER
BY Gray, Mace & Dunson

ATTORNEYS

United States Patent Office 3,527,946
Patented Sept. 8, 1970

3,527,946
SEMICONDUCTOR DOSIMETER HAVING LOW TEMPERATURE DIFFUSED JUNCTION
Gordon Kramer, 645 Neil Ave.,
Columbus, Ohio 43215
Filed June 13, 1966, Ser. No. 557,258
Int. Cl. G01t 3/00
U.S. Cl. 250—83.1          2 Claims

ABSTRACT OF THE DISCLOSURE

A fast-neutron radiation dosimeter comprising a semiconductor having a low temperature diffused p-n junction comprising silicon with a dopant of lithium diffused therein. Total dosage is indicated by measuring the short circuit current obtained in the presence of light (photovoltaic effect).

---

Figure 3:
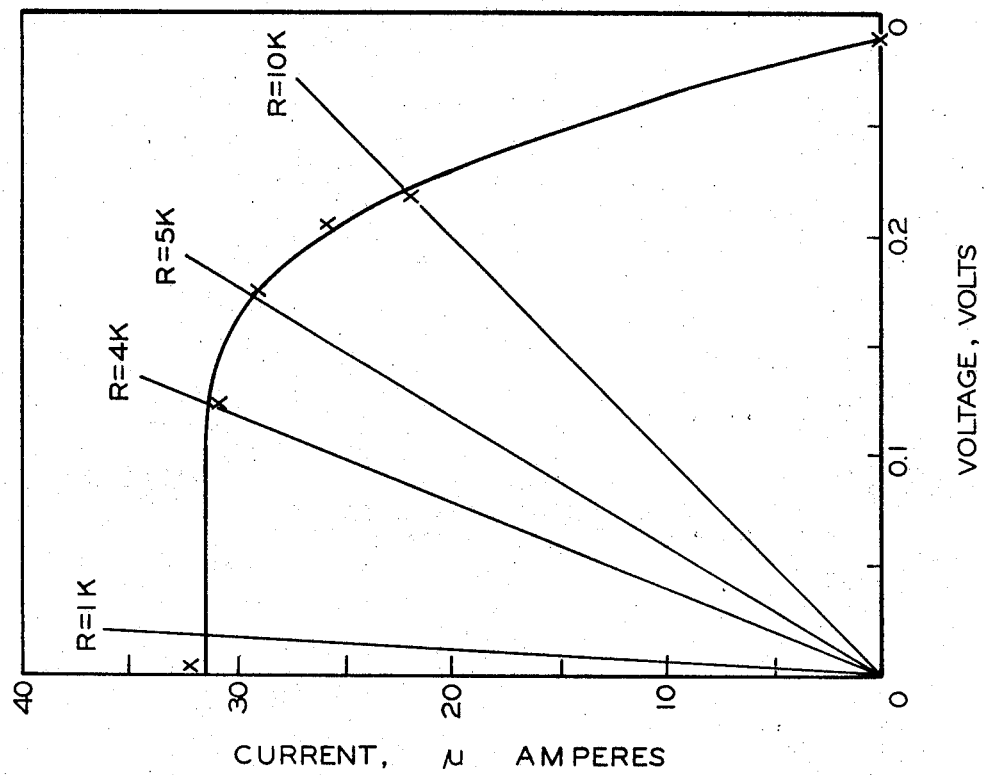

The junction is made by evaporating a thin film of lithium onto a free surface of a wafer of p-type silicon maintained at elevated temperature, preferably below 400° C., to diffuse lithium therein and to convert at least a portion of the wafer below the free surface to an n-type region.

This invention relates to semiconductor dosimeters for measuring radiation, and further to a method for measuring the total dose of fast-neutron radiation to which a semi-conductor dosimeter has been exposed.

Decreases in charge carrier lifetimes of silicon semiconductor materials upon fast-neutron irradiation have been utilized previously in n+-p-p+ dosimeters for measuring fast-neutron irradiation. To obtain the n+ and p+ regions in the above-described silicon junction rectifiers, boron and phosphorus are diffused at temperatures of 1150° C. and a time of about 3 hours and temperatures of 1220° C. and a time of about 6 hours respectively. A dosimeter thermally treated according to he above-described practice is sensitive in the range of from 20 to 10,000 rads in tissue. The lower limit represents the sensitivity threshold for these devices or the limits of response to lower levels of fast-neutron radiation. According to theory, the sensitivity of a dosimeter will increase as the initial carrier diffusion length ($L_D$) is increased. $L_D$ is equal to $\sqrt{D\tau}$, where D is the diffusion constant and $\tau$ is the lifetime for free carriers.

The decrease of charge carrier lifetime as a result of irradiation above the sensitivity threshold is measured in present devices by the change in forward resistance of the dosimeter as a result of irradiation. This is derived from the current voltage relationship:

$$V = \frac{2k\tau}{e} \exp \frac{W}{2L_o} + \log \frac{L_D J}{KT\mu n}$$

where J is current density, $\mu$ is carrier mobility, $n_1$ is the thermal equilibrium instrinsic carrier concentration, and W is the base width of the dosimeter. Because the second term of the equation introduces a factor for junction voltage drop, the sensitivity of the voltage-current characteristics to a decrease in $L_D$ is reduced. In addition, where contact resistance is significant compared with the resistance of the base region, the sensitivity of a device analyzed by means of forward resistance is severely degraded.

It is a feature of the present invention that a dosimeter is provided having a threshold of sensitivity to fast neutrons of at least an order of magnitude lower than presently available devices.

It is another feature of the present invention that a dosimeter is provided having improved linear sensitivity.

It is still another feature of the present invention that simple fabrication procedures are provided for making an improved dosimeter.

proved method is provided for measuring carrier lifetime or sensitivity to fast neutrons.

It is another feature of this invention that an improved sensitivity dosimeter is provided which is responsive to the accumulated dose to which it has been subjected during its lifetime.

Figure 4:
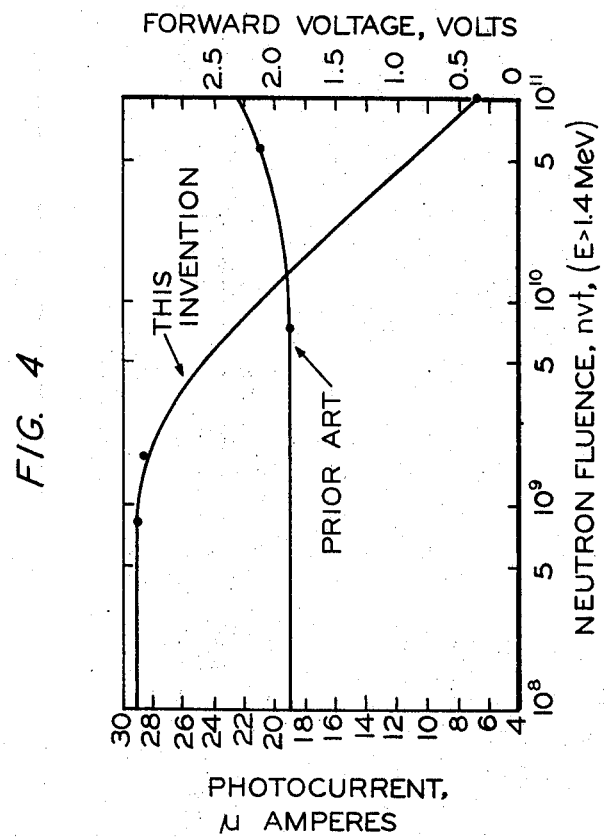

In the drawings:
FIG. 1 shows a semiconductor dosimeter according to the invention;
FIG. 2 shows a method of measuring sensitivity to a total dose of radiation according to the invention;
FIG. 3 is a graphical representation of the current-voltage relation of a new semiconductor dosimeter measured according to the invention;
FIG. 4 compares the threshold of sensitivity according to this invention with that achievable in prior art methods and devices.

The invention includes within its scope a dosimeter having a low-temperature diffused p-n junction. The invention further includes means for monitoring the radiation-induced decrease in charge carrier lifetime of a dosimeter by the photovoltaic effect. In one embodiment of the invention, a low-temperature diffused junction is achieved by the diffusion of lithium at temperatures in the order of about 400° C. In another embodiment, a shallow diffused junction is achieved by diffusion of phosphorus at about 990° C. The short-circuit photocurrent response of dosimeter devices to radiation of known type and intensity following neutral irradiation provides a reliable determination of charge carrier lifetime.

Devices made according to the invention are useful as personnel radiation hazard meters as well as field monitors for radiation-effects testing to measure the integrated neutral flux at various sites. Because of its small size and weight, the device is useful in space applications and biological dosimetry. The device offers possible application as a mixed field dosimeter for use in a mixed neutron-gamma field.

THEORY

The time-temperature cycle used to diffuse dopant in a semiconductor dosimeter base material can serve to degrade the charge carrier lifetimes or decrease the initial carrier diffusion length in the base material in the same manner as neutron irradiation and thereby raises the threshold of sensitivity of the device from that theoretically available prior to treatment.

Lithium introduced as a dopant in silicon acts as a donor with an activation energy of 0.03 ev. and diffuses interstitially. Lithium has a diffusion constant of the order of a factor of $10^7$ higher than those measured for impurities which diffuse by a vacancy mechanism (for example, boron and phosphorus). In the fabrication of dosimeters, the lithium is diffused into p-type silicon at a temperature between 300 and 450° C. and a time from 1 to 5 minutes. A p-n junction is formed at a distance $d$ below the surface. At this point, the lithium concentration, $N_{Li}$, is equal to the acceptor concentration, $N_A$, in the starting silicon.

The lithium concentration after diffusion is given by:

$$N(x) = N_0 \, \text{erfc} \frac{x}{2(D_T t)^{1/2}}$$

where $N_0$ is the surface concentration of lithium, $t$ is time, and $D_T$ is the diffusion constant of lithium at the diffusion temperature, T.

The diffusion constant of lithium in silicon is $$D_T = 6 \times 10^{-4} \exp(-0.61q/kt)$$

At $T = 750°$ K. $D_T = 3.48 \times 10^{-8}$.

$N_0$ is determined from the solubility of lithium in silicon at 750° K. and is given as $8 \times 10^{17}$ atoms/cm.³. For a diffusion time of 100 seconds, the characteristic diffusion distance, $(D_T t)^{1/2}$ would be 18.7μ. Because the acceptor concentration in the base is $3 \times 10^{14}$ atoms/cm.³, it would require approximately seven diffusion distances from the surface for the lithium concentration to equal the acceptor concentration at the stated diffusion time and temperature. The junction depth is therefore approximately 130μ from the surface.

Instead of diffusing a dopant that migrates by an interstitial mechanism to reduce thermal degradation of the charge carrier lifetime as for lithium, both time and temperature can be reduced to produce a shallow diffused device from a dopant known to diffuse by a vacancy mechanism. For example, phosphorus can be diffused for 30 minutes at 900° C. to form a junction 10 microns below the surface.

The photovoltaic effect in a p-n junction device is the generation of an electric current by absorption of radiant energy. The current-voltage relationship for the generated power under the condition of uniform generation of carriers throughout the semiconductor is given by $$I = eg_0 L_D - I_0[\exp(eIR/kT) - 1]$$

where $e$ is electronic charge; $g_0$, the generation rate of electron-hole pairs; $I_0$, the diode saturation current; $L_D$, the diffusion length; and R, the external load resistance (including stray contact resistances).

The short-circuit photocurrent density (current generated when the junction is short circuited) is given by:

$$I_{s.c.} = eg_0 L_D$$

A decrease in diffusion length due to irradiation causes a decrease in short-circuit photocurrent. As long as the external resistance R is much less than the internal impedance of the p-n junction given by $kT/eI_0$, the observed current I will be the short-circuit current. In practice, an external resistance of less than 1000 ohms is satisfactory.

The short-circuit current under the condition of non-uniform generation of carriers by monochromatic radiation, and taking into account reflection at the semiconductor surface is:

$$I = \frac{AH(1-R)\alpha L_D}{E_{hu}(1+\alpha L_D)}$$

where A is illuminated junction area; H is absolute light energy density, watts/cm.²; R is reflection coefficient for light photons of energy $E_{hu}$, joules; and $\alpha$ is absorption coefficient, cm.⁻¹, for photons of wavelength, λ.

By using light of a particular wavelength that is absorbed principally in the base region of the dosimeter, the response is made most sensitive to changes in base diffusion length. At wavelengths greater than 0.9μ, the surface-layer response is quite small, and most of the current is produced in the base region. For this reason, a wavelength of about 1μ is preferable for generating a photocurrent with which to monitor the carrier diffusion length. At longer wavelengths, a smaller fraction of the incident light will be absorbed to decrease the conversion efficiency.

Referring to the embodiment illustrated in FIG. 1, a dosimeter 10 comprises a low temperature diffused junction forming an n-type region 12 in a p-type base material 14. The n-type region 12 is formed by low temperature diffusion of an interstitial dopant such as lithium or by shallow diffusion of a vacancy migration dopant to a depth $d$ in a surface of the p-type material. The contacts 16 and 18 are affixed at surfaces of each of the semiconductor regions 12 and 14. Contacts 16 and 18 comprise materials that may be affixed to the n-type and p-type surfaces at temperature levels that do not degrade the dosimeter properties. In measuring the short-circuit photocurrent, the dosimeter 10 is mounted in the holder 22 of FIG. 2 which fixes its position by grasping it with arms 25 and contacts it on three sides with the insulating plastic 24. Pressure electrodes 26—26 electrically connect the contacts 18 and 16 with an ammeter. A light source 30 directs an incident light beam through a filter 32 capable of absorbing undesirable wavelengths of light to the free surface 28 of the dosimeter 10 and photocurrent is read by the ammeter. A square configuration of dosimeter insures uniformity of readings as round dosimeters tend to vary in sensitivity with position of the light source on the junction circumference.

METHOD FOR LITHIUM DOSIMETERS

According to the invention, low-temperature diffused dosimeters are made by the steps of:

(a) crystal cutting,
(b) lithium diffusion,
(c) application of contacts,
(d) assembly.

Steps (b) and (c) are carefully controlled to avoid high temperature degradation. The p-type ingots purified by floating zone techniques are sliced into wafers in a direction parallel to the <111> plane. Wafers are ground flat and checked for resistivity and conductivity type. Commercially available five point probe resistivity equipment and a hot probe tester may be used.

Preparatory to lithium diffusion, wafers are cleaned separately in hot (95° C.) distilled water, hot methyl alcohol, and hot trichloroethylene under ultrasonic agitation. The wafers are then etched for 5 minutes in methyl alcohol. Wafers are dried and mounted in a vacuum heating chamber wherein wafers are dried at about 200° C. for a short period of time (e.g., 20 minutes) to drive off surface contaminants. The temperature is then raised to 450° C. and a thin film of lithium is evaporated onto a surface of the silicon and temperature maintained for a time sufficient to diffuse the lithium to the desired depth to convert the surface from p-type to n-type. The wafer cools in the vacuum and, following removal from the heating chamber, excess lithium is removed.

Electrical contacts should have low resistance and must be applied at low temperatures. This latter factor is of particular importance at the n-type surface to avoid destruction of the junction characteristics by additional diffusion and redistribution of the underlying lithium.

At the p-type surface, a silicon-gold alloy having a eutectic temperature of 377° C. and a resistance of less than 1 ohm is suitable. The gold alloyed contact is made by evaporating a thin film of gold (about 5000 A.) onto the silicon wafer and heating while still in the vacuum chamber to approximately 450° C. The surface is readily solderable if a sufficient excess of gold or an overlay of copper or silver is deposited on the surface. When soldering to silver, however, a special solder containing 2.5 percent silver is required, and the temperature must be carefully controlled at 250° C. to prevent the silver contact from dissolving in the solder.

Ultrasonic soldering of indium provides a low-temperature contact of indium applied to the silicon by means of an ultrasonically vibrating probe. The indium is rubbed into the silicon to break through any oxide layers or other high-resistance surface elements. The process is essentially "cold" with only negligible heating from friction, and the resistance is satisfactorily low. The only disadvantage to the use of indium is a result of its low-melting point (156° C.).

Electroless nickel plating is another suitable contact procedure. This process requires heating the sample in a solution of $NiCl_2$ to 95° C. for 3 minutes. Nickel deposits out of solution onto the silicon surface. The temperature is sufficiently low to avoid additional lithium diffusion or lifetime degradation. Uniform films are obtained which are readily solderable. Although nickel contacts produced as described are the least harmful to the lithium junction, their resistance is 50 to 75 ohms. This value is too high for adequate sensitivity when monitoring the forward resistance of the neutron dosimeter but is sufficiently low to allow accurate measurement of the short circuit photocurrent. In the latter case, the nickel contacts are used at the n-type surfaces because of their minimal effect on lithium diffusion whereas the low resistance silicon-gold or indium are applied at the less sensitive p-type surfaces.

After applying suitable contacts, the wafer is mounted with crystal cement to a glass substrate, and a cover glass is cemented to the top of the wafer. The dosimeters are cut into squares, to yield several devices from one wafer.

EXAMPLE 1

A floating zone purified ingot of silicon having a resistiivty of 5 ohm-cm. was cut into .060-inch thick wafers in a direction parallel to the <111> plane. The wafers were then finished to a thickness of .054-inch to remove cutting marks. Lithium diffused into a p-type surface of the wafers to form an n-type region in accordance with the previously described method for lithium dosimeters. Processing conditions and junction depth as measured by staining are set forth below in Table I.

TABLE I.—PREPARATION OF LITHIUM DOSIMETERS

| Processing | Junction depth, mils |
|---|---|
| Wafer No.: | |
| $L_1$ — Lithium, vacuum evaporated and diffused. Diffusion at 422° C., 15 seconds. Slow cool to 100° C., argon flush. | 5 |
| $L_2$ — Same as for $L_1$ | 6–7 |
| $L_3$ — do | 6–7 |
| $L_4$ — Lithium vacuum evaporated and diffused. Baked at 200° C., 20 minutes. Diffused 200° C., 90 minutes. Slow cooled to room temperature. | 2 |
| $L_5$ — Lithium vacuum evaporated and diffused 300° C., 10 minutes. | 5 |
| $L_6$ — Lithium vacuum evaporated and diffused. Baked at 300° C., 30 minutes. Diffused 300° C., 45 minutes. | 5.5 |

An indium soldered contact was affixed to the p-type base region of the wafer and the diffused region was electroless nickel plated. The dosimeters were cut into squares of 0.120 inch to yield about 30 devices from a wafer.

Minority carrier lifetime was measured on several lithium diffused dosimeters by the open-circuit voltage-decay technique described in Proc. IRE, vol. 477, April, 1955. This measurement consists of applying a forward voltage to the p-n junction and then observing the decay of this voltage with time. The slope of the decay curve is a function of the lifetime. The slope of the lithium-diffused devices indicated lifetimes on the order of 200μ sec.

EXAMPLE 2

Wafers finished in accordance with the procedure of Example 1 were phosphorus diffused as set forth below in Table II.

TABLE II.—PREPARATION OF PHOSPHORUS DOSIMETERS

| Processing | Junction depth, mils |
|---|---|
| Wafer No.: | |
| $P_1$ — Phosphorus diffused 900° C., 30 minutes. Cooled 15 hours at 600° C. | <0.4 |
| $P_2$ — Same as for $P_1$ | <0.4 |
| $P_3$ — Phosphorus diffused 900° C., 30 minutes. 600° C., 1 hour. | <0.4 |

Following diffusion, contacts were affixed and dosimeters prepared as in Example 1. Open-circuit voltage decay measurements on the phosphorus-diffused devices showed different decay curves than those for the lithium diffused devices of Example 1. The curves of the phosphous devices decayed much more rapidly, but did not evidence a constant slope so that it was not possible to measure the lifetime. The measurements did indicate that the lifetime of the lithium-diffused dosimeter was higher than that of the phosphorus-diffused types.

EXAMPLE 3

Average initial photocurrent response of the lithium wafers of Example 1 was determined in the manner described in FIG. 2, using brass electrodes under pressure to provide electrical contact. Resistivity was determined using a five-point resistivity probe. The data is shown below in Table III.

TABLE III.—PROPERTIES OF LITHIUM DIFFUSED WAFERS PROCESSED ACCORDING TO TABLE I

| | Sheet resistivity, ohms/ square cm. | Average initial photocurrent response of dosimeters, μamp. |
|---|---|---|
| Wafer: | | |
| $L_1$ | 11.0 | 14.5 |
| $L_2$ | 6.5 | 29.0 |
| $L_3$ | 7.8 | 22.5 |
| $L_4$ | 700 | 25.0 |
| $L_5$ | 22.0 | 13.3 |
| $L_6$ | 27.0 | 19.4 |

Lithium dosimeters prepared from the wafers were irradiated at the fission plate of a water-modulated, water-cooled, enriched-uranium, fuel-type reactor. Mounting of the sample on the fission plate was such that the neutron flux was uniform to within ±½ percent over the sample holder. Threshold detectors of indium and sulfur were used for dosimetry and read at intervals between successive irradiations. Each of two runs consists of four successive exposures. The devices were irradiated and the photocurrents read a few hours later. The first run used ten dosimeters from each of two lithium wafers. In addition, five dosimeters from each wafer that were not irradiated were read at each point as controls. For the second run, five dosimeters from each of the six lithium-diffused wafers were used. Three devices from each wafer served as controls.

Photovoltaic response was read using an optical system consisting of an incandescent projector lamp, a lens, and a 1-mil silicon filter to absorb the shorter visible wavelengths. The photocurrent was read with a four-place digital voltmeter HP3440A. The load resistance was 1000 ohms. This is a sufficiently low enough resistance to assure a measurement of the short-circuit photocurrent. The photovoltaic response curve of a typical dosimeter is shown in FIG. 3. This is a plot of the voltage and current output of the device at various load resistances. The equivalent internal impedance of the device is seen to be approximately 5000 ohms, and no significant change in current is noted until the load resistance exceeds 4000 ohms. The contact resistance, as determined from forward resistance measurements on the dosimeters was less than 600 ohms so that the total resistance in series with the p-n junction was about 1600 ohms.

The dosimeter photocurrent readings for the two irradiation runs are summarized in Table IV. The integrated fast-neutron fluences are indicated at the head of each column in the table. In some cases, variations in control readings occurred, and the dosimeter readings were normalized to the control readings. This variation has been attributed to changes in the ambient temperature.

TABLE IV.—SHORT-CIRCUIT PHOTOCURRENT AT VARIOUS NEUTRON FLUENCE LEVELS FOR LITHIUM-DIFFUSED DOSIMETERS

| | Number of Dosimeters | Short Circuit Photocurrent, μamperes | | | | |
|---|---|---|---|---|---|---|
| | | (a) Run 1. Fast-Neutron Fluence E>1.4 Mev. | | | | |
| | | 0 nvt. | 8.3×10⁸ nvt. | 1.83×10⁹ nvt. | 8.1×10⁹ nvt. | 9.8×10¹⁰ nvt. |
| Wafer: | | | | | | |
| $L_2$ | 10 | ¹ 30.05±1.11 | 28.87±1.01 | 28.58±1.00 | 21.55±0.64 | 7.04±0.45 |
| $L_3$ | 10 | ¹ 23.00±1.04 | 22.47±1.07 | 21.98±1.25 | 17.10±0.99 | 6.10±0.40 |
| | | (b) Run 2. Fast-Neutron Fluence E>1.4 Mev. | | | | |
| | | 0 nvt. | 1.1×10⁸ nvt. | 1.3×10⁹ nvt. | 9.8×10⁹ nvt. | 1.09×10¹¹ nvt. |
| $L_1$ | 5 | ¹ 14.90±0.14 | ¹ 14.81±0.15 | 14.57±0.17 | 12.43±0.34 | 6.01±0.36 |
| $L_2$ | 5 | ¹ 27.75±0.28 | 27.19±0.25 | 26.93±0.56 | 20.71±0.83 | 7.13±0.74 |
| $L_3$ | 5 | ¹ 21.38±0.73 | ¹ 21.05±0.79 | 20.43±0.62 | 15.81±0.72 | 6.60±0.23 |
| $L_4$ | 5 | ¹ 26.65±0.40 | ¹ 25.85±0.77 | 24.14±0.42 | 16.48±0.35 | 6.55±0.43 |
| $L_5$ | 5 | ¹ 14.05±0.19 | ¹ 14.10±0.13 | 14.01±0.19 | 12.09±0.27 | 6.40±0.39 |
| $L_6$ | 5 | ¹ 20.39±0.11 | ¹ 20.40±0.34 | 19.90±0.21 | 16.30±0.34 | 7.24±0.47 |

¹ Normalized to control readings.
nvt.=neutrons per square centimeter.

The threshold of sensitivity is observed to occur at about $10^9$ nvt. Linear sensitivity is high. For example, in Run 1, the dosimeters from wafer $L_2$ exhibit a current change of 23μ amps after irradiation to $9.8 \times 10^{10}$ nvt. The data for dosimeters from wafer $L_2$ is compared in FIG. 4 with a prior art boron and phosphorus deep-diffused device in which the change in forward resistance is monitored. The tissue dose in rads is obtained by converting the measured fluence for E>1.4 mev. to a fast-neutron fluence of E>0.50 mev. on the basis of a Watt's fission spectrum and, assuming an average neutron energy of 1 mev., converting the figure to rads by using a conversion factor of $4.05 \times 10^8$ nvt. per rad of muscle tissue. Defining a 1 percent change in photocurrent, i.e., 0.30μ amp, as the threshold of detection, a threshold of sensitivity of 2 rads is obtained for the lithium-diffused dosimeters of wafer $L_2$, Run 1, when used with the short-circuit photocurrent measurement technique.

EXAMPLE 4

Average initial photocurrent response and resistivity of the phosphorus wafers of Example 2 was determined as follows:

TABLE V.—PROPERTIES OF PHOSPHORUS DIFFUSED WAFERS PROCESSED ACCORDING TO TABLE II

| | Sheet resistivity, ohms/ square cm. | Average initial photocurrent response of dosimeters, A |
|---|---|---|
| Wafer: | | |
| $P_1$ | 23.0 | 18.5 |
| $P_2$ | 16.0 | 14.5 |
| $P_3$ | 19.0 | 4.0 |

Phosphorus dosimeters prepared from the wafers were irradiated in two separate runs and photovaltaic response was read in exactly the same manner as described for the lithium dosimeters of Example 3. The dosimeter photocurrent readings for the two runs are summarized below in Table VI.

The threshold of sensitivity is observed to occur at about $10^9$ nvt. and a threshold of sensitivity of about 2 rads is calculated for the phosphorus-diffused dosimeters with the short-circuit photocurrent measurement technique. With regard to linear sensitivity, dosimeters from $P_1$ show a change of 15.3μ amps after irradiation to $9.8 \times 10^{10}$ nvt. (E>1.4 mev.).

The behavior of a lithium dosimeter at the sensitivity threshold can be predicted by a consideration of the effect of radiation on the diffusion length L for free carriers. Defining the sensitivity threshold as that fast-neutron fluence required to cause a 10 percent reduction in L, and thus in the photocurrent, one obtains $$L = 0.9 L_0$$

The radiation damage constant is defined by $$1/LD^2 = 1/LD_0^2 + K_L$$

Therefore, $$1.0/(0.9 L_0)^2 = 1/L_0^2 + K$$

$$L_0 = \left(\frac{0.23}{K\Phi}\right)^{1/2}$$

An available value for K, obtained from Bell Telephone Laboratories, NEEP, Tenth Triannual Technical Note, 39 (July 15, 1962) is $5.5 \times 10^{-7}$ (neutrons)⁻¹, and selecting a threshold of sensitivity of $10^8$ nvt., we have $L_0 = 440\mu = 17.3$ mils
$\tau = L_0^2/D = 150\mu$ s.
D = diffusion constant
36 cm.²/sec.

Thus, for as low as a 150μ s. starting lifetime, one might expect a threshold of sensitivity of $10^8$ nvt. Because lifetimes as high as 200μ s. are observed in Example 1, further improvement of threshold of sensitivity over that shown in connection with the lithium dosimeters of Example 3 can be expected.

Room-temperature annealing of the devices following irradiation will cause some increase of photocurrent until TABLE VI.—SHORT-CIRCUIT PHOTOCURRENT AT VARIOUS NEUTRON FLUENCE LEVELS FOR PHOSPHORUS-DIFFUSED DOSIMETERS

| | Number of Dosimeters | Short Circuit Photocurrent, μamperes | | | | |
|---|---|---|---|---|---|---|
| | | (a) Run 1. Fast-Neutron Fluence E>1.4 mev. | | | | |
| | | 0 nvt. | 8.3×10⁸ nvt. | 1.83×10⁹ nvt. | 8.1×10⁹ nvt. | 9.8×10¹⁰ nvt |
| Wafer: | | | | | | |
| $P_1$ | 10 | 17.75±0.27 | 17.61±0.24 | 17.11±0.30 | 10.59±0.56 | 2.46±0.19 |
| $P_2$ | 10 | ¹ 15.00±0.44 | 14.68±0.49 | 14.39±0.47 | 9.74±0.48 | 2.72±0.25 |
| | | (b) Run 2. Fast-Neutron Fluence E>1.4 mev. | | | | |
| | | 0 nvt. | 1.1×10⁸ nvt. | 1.3×10⁹ nvt. | 9.8×10⁹ nvt. | 1.09×10¹¹ nvt |
| $P_1$ | 5 | ¹ 18.80±0.21 | ¹ 18.53±0.15 | 17.57±0.20 | 11.16±0.59 | 2.71±0.18 |
| $P_2$ | 5 | ¹ 15.00±0.10 | ¹ 14.97±0.14 | 14.12±0.11 | 9.90±0.26 | 2.79±0.30 |

¹ Normalized to control readings.
nvt.=neutrons per square centimeter.

it reaches a final value. A suitable correction factor can be applied to compensate for the annealing.

The low temperature diffused junction of this invention is seen to provide several advantages in providing a lowered threshold of sensitivity, improved sensitivity and higher yield.

Measurement of the decrease in short-circuit current for monitoring the radiation-induced change in carrier diffusion length or lifetime offers advantages over monitoring the forward resistance in that the output is a function of diffusion length alone and does not include other terms, such as junction voltage drop. Further, the internal impedance of the current generator can be several thousand ohms, and thus the current is independent of contact resistances on the order of hundreds of ohms. Thus, the use of short-circuit photocurrent as the read-out method increases the uniformity of response between devices, since the observed contact resistances on the low-temperature diffused devices are of the order of 100 ohms and are, therefore, of no consequence.

The dosimeter need be read only before and after the irradiation and thus requires no power or instrumentation during exposure. However, it is possible to monitor the dosimeter continuously during irradiation. In some instances, this may be desirable in order to attain a specific fluence level.

An advantage in many situations, such as space applications and biological dosimetry, is the small size and weight of the dosimeter. The small size also allows an accurate determination of the spatial resolution of the neutron flux which is of particular value when testing complex systems where the flux may vary considerably in different locations. The dosimeter offers possibilities as a mixed field dosimeter. When placed in a mixed neutron-gamma field, either the change in reverse current or the short-circuit photocurrent of the dosimeter is a measure of the gamma-ray dose rate. The neutron contribution to this current is, for most practical cases, negligible. The permanent change in carrier lifetime is a measure of the integrated neutron flux. The gamma contribution to the permanent damage is, for most practical cases, negligible.

Numerous other uses and advantages of this invention will be apparent. It will be understood that various changes in the details, materials, steps and arrangements of parts, which have been herein described and illustrated in order to explain the nature of the invention may be made within the principles and scope of the invention.

What is claimed is:

1. A semiconductor dosimeter comprising a p-n junction consisting essentially of silicon and a dopant of lithium diffused therein at a temperature of about 300° to 450° C. and having a crystal lattice that is increasingly and measurably altered when exposed to increased accumulated doses of fast-neutron radiation.

2. A dosimeter as in claim 1, provided additionally with contacts consisting essentially of a material of the group consisting of alloys of gold, silicon, indium, nickel, and combinations thereof affixed to at least a portion of the p-type and n-type surfaces thereof.

References Cited

UNITED STATES PATENTS

| | | |
|---|---|---|
| 2,975,286 | 3/1961 | Rappaport et al. |
| 2,988,639 | 6/1961 | Welker et al. _____ 250—83.1 |
| 3,129,329 | 4/1964 | Love et al. _____ 250—83.1 |
| 3,210,548 | 10/1965 | Morrison. |
| 3,351,758 | 11/1967 | Armantrout et al. ___ 250—83.1 |

ARCHIE R. BORCHELT, Primary Examiner

U.S. Cl. X.R.

250—211

UNITED STATES PATENT OFFICE
CERTIFICATE OF CORRECTION

Patent No. 3,527,946 September 8, 1970

Gordon Kramer

It is certified that error appears in the above identified patent and that said Letters Patent are hereby corrected as shown below:

In the heading to the printed specification, lines 4 and 5, "Gordon Kramer, 645 Neil Ave., Columbus, Ohio 43215" should read -- Gordon Kramer, Columbus, Ohio, assignor to The Battelle Development Corporation, Columbus, Ohio, a corporation of Delaware --. The line below the Abstract of the Disclosure should be one paragraph lower on the page. Column 1, line 38, "he" should read -- the --. Column 2, line 4 should be moved to become line 7. Column 5, line 26, "resistiivty" should read -- resistivity --; line 75, before "600° C" insert -- Cooled --.

Signed and sealed this 15th day of December 1970.

(SEAL)
Attest:

Edward M. Fletcher, Jr.
Attesting Officer

WILLIAM E. SCHUYLER, JR.
Commissioner of Patents

Dedication 3,527,946.—*Gordon Kramer*, Columbus, Ohio. SEMICONDUCTOR DOSIMETER HAVING LOW TEMPERATURE DIFFUSED JUNCTION. Patent dated Sept. 8, 1970. Dedication filed May 7, 1973, by the assignee, *The Battelle Development Corporation*.

Hereby dedicates to the People of the United States the entire remaining term of said patent.

[*Official Gazette December 11, 1973.*]